United States Patent
Berge et al.

(10) Patent No.: US 9,478,086 B1
(45) Date of Patent: Oct. 25, 2016

(54) ACCESS CONTROL SYSTEM THAT DETECTS STATIC ELECTRICITY

(71) Applicant: International Business Machines Corporation, Armonk, NY (US)

(72) Inventors: Layne A. Berge, Rochester, MN (US); John R. Dangler, Rochester, MN (US); Matthew S. Doyle, Chatfield, MN (US); Thomas W. Liang, Rochester, MN (US); Manuel Orozco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/954,536

(22) Filed: Nov. 30, 2015

(51) Int. Cl.
*G07C 9/00* (2006.01)
*G06K 7/08* (2006.01)

(52) U.S. Cl.
CPC ........... *G07C 9/00174* (2013.01); *G06K 7/081* (2013.01)

(58) Field of Classification Search
CPC ........................... G07C 9/00174; G06K 7/081
See application file for complete search history.

(56) References Cited

U.S. PATENT DOCUMENTS

| | | | | |
|---|---|---|---|---|
| 5,991,145 A | * | 11/1999 | Lagrotta | H05F 3/02 361/212 |
| 6,150,945 A | * | 11/2000 | Wilson | G01R 29/12 324/457 |
| 6,318,632 B1 | * | 11/2001 | Grant | G06K 7/0013 15/210.1 |
| 6,510,987 B1 | * | 1/2003 | Hengriprasopchoke | G01R 31/001 235/380 |
| 6,515,488 B1 | | 2/2003 | Thomas | |
| 6,900,644 B2 | | 5/2005 | Chou et al. | |
| 6,991,477 B1 | * | 1/2006 | Hsiao | G06K 7/0082 439/92 |
| 2010/0230496 A1 | * | 9/2010 | Kim | G06K 19/07 235/488 |
| 2012/0043382 A1 | * | 2/2012 | Hong | G06K 7/0082 235/441 |

FOREIGN PATENT DOCUMENTS

| | | |
|---|---|---|
| CN | 1661380 A | 8/2005 |
| CN | 102353855 A | 2/2012 |

OTHER PUBLICATIONS

English translation of Chinese text of Canadian Patent Application Publication No. CN1661380A, Aug. 31, 2005.
English translation of Chinese text of Canadian Patent Application Publication No. CN102353855A, Feb. 15, 2012.
Berge et al., "Access Control System That Detects Static Electricity", U.S. Appl. No. 15/057,357, filed Mar. 1, 2016.
Appendix P—List of IBM Patents or Patent Applications Treated As Related.

\* cited by examiner

*Primary Examiner* — Kristy A Haupt
(74) *Attorney, Agent, or Firm* — Martin & Associates, LLC; Derek P. Martin

(57) ABSTRACT

An access control system removes the human element from static protection by detecting a level of static energy when the user attempts to authenticate to the access control system, and when the user's detected level of static energy exceeds a defined threshold, access is denied until the user discharges the static energy. A static energy detection mechanism in a badge reader includes two conductive plates that form a first capacitor, and the space between an electrically conductive badge and one of the conductive plates on the badge reader forms a second capacitor. Using these two capacitors, the level of static energy on the user can be measured by the sum of the voltage across these two capacitors as the user presents the badge to the badge reader. The access control system assures the user is properly grounded before allowing access to an area, equipment, etc.

9 Claims, 5 Drawing Sheets

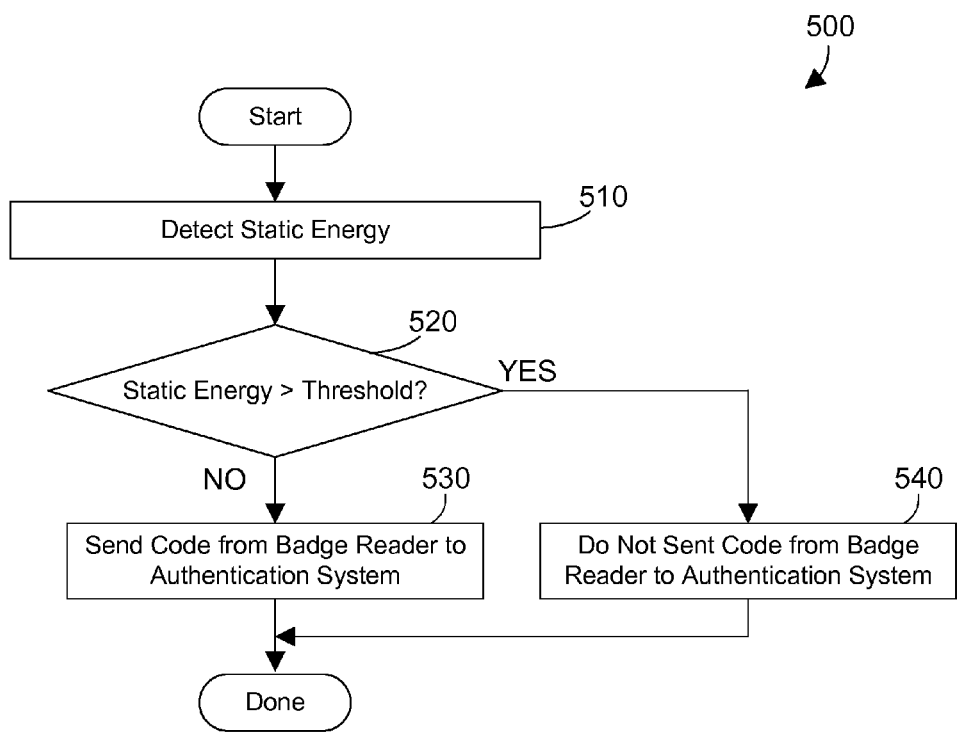

FIG. 5

| Sample Applications | |
|---|---|
| Entry to Lab or Area with Sensitive Electronic Components | 610 |
| Point of Use Electronic Equipment | 620 |
| Badge Readers at Service Door to Server Hardware | 630 |
| Inhibit Fuel Pump of Fueling Station when Static is Detected | 640 |
| Embed Static Sensor into Lab Door Handle to Sense Charge on a Hand and Allow or Deny Access Based on the Sensed Charge | 650 |
| Embed Static Sensor into Equipment Buttons to Sense Charge on a Hand and Allow or Deny Access (or Function) Based on the Sensed Charge | 660 |
| Embed Static Sensor into Seat or Chair in a Lab | 670 |

FIG. 6

ACCESS CONTROL SYSTEM THAT DETECTS STATIC ELECTRICITY

BACKGROUND

1. Technical Field

This disclosure generally relates to access control systems, and more specifically relates to badge readers for providing access to people based on a code read wirelessly from the badge.

2. Background Art

By some estimates, electro-static discharge (ESD) accounts for losses of a half billion to five billion dollars annually to sensitive electronics and equipment. ESD can occur when static electricity builds up on a person who then handles static-sensitive electronics. Most areas that include static-sensitive electronics or equipment include an access control system, such as a badge reader that activates an electric door lock, so that only authorized personnel who are properly trained in using ESD devices according to established ESD procedures are allowed access.

Once a person gains access to an area that has sensitive electronics and/or equipment, conventional methods to thwart ESD damage include ESD wrist straps and ESD shoes with specified procedures. However, those methods are only effective to the extent they are used properly. Thus, if an ESD strap is defective, or if ESD shoes are worn with insoles that electrically insulate the foot from the shoe, the effectiveness of these devices and their corresponding methods can be compromised. The current methods of ESD protection all require the user to be vigilant to use proper ESD protection devices and methods, thereby introducing a human element that invariably leads to economic losses in the form of damaged electronics or equipment when there is a breakdown in the ESD protection devices or the methods.

BRIEF SUMMARY

An access control system removes the human element from static protection by detecting a level of static energy when the user attempts to authenticate to the access control system, and when the user's detected level of static exceeds a defined threshold, access is denied until the user discharges the static energy. A static energy detection mechanism in a badge reader includes two conductive plates that form a first capacitor, and the space between an electrically conductive badge and one of the conductive plates on the badge reader forms a second capacitor. Using these two capacitors, the level of static energy on the user can be measured by the sum of the voltage across these two capacitors as the user presents the badge to the badge reader. The access control system assures the user is properly grounded before allowing access to an area, equipment, etc.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 5 is a flow diagram of one specific method for denying access to a user when the user has excessive static energy;

FIG. 6 is a table showing some sample applications for the access control system in FIG. 1;

DETAILED DESCRIPTION

An access control system removes the human element from static protection by detecting a level of static energy when the user attempts to authenticate to the access control system, and when the user's detected level of static energy exceeds a defined threshold, access is denied until the user discharges the static energy. A static energy detection mechanism in a badge reader includes two conductive plates that form a first capacitor, and the space between an electrically conductive badge and one of the conductive plates on the badge reader forms a second capacitor. Using these two capacitors, the level of static energy on the user can be measured by the sum of the voltage across these two capacitors as the user presents the badge to the badge reader. The access control system assures the user is properly grounded before allowing access to an area, equipment, etc.

Figure 1:
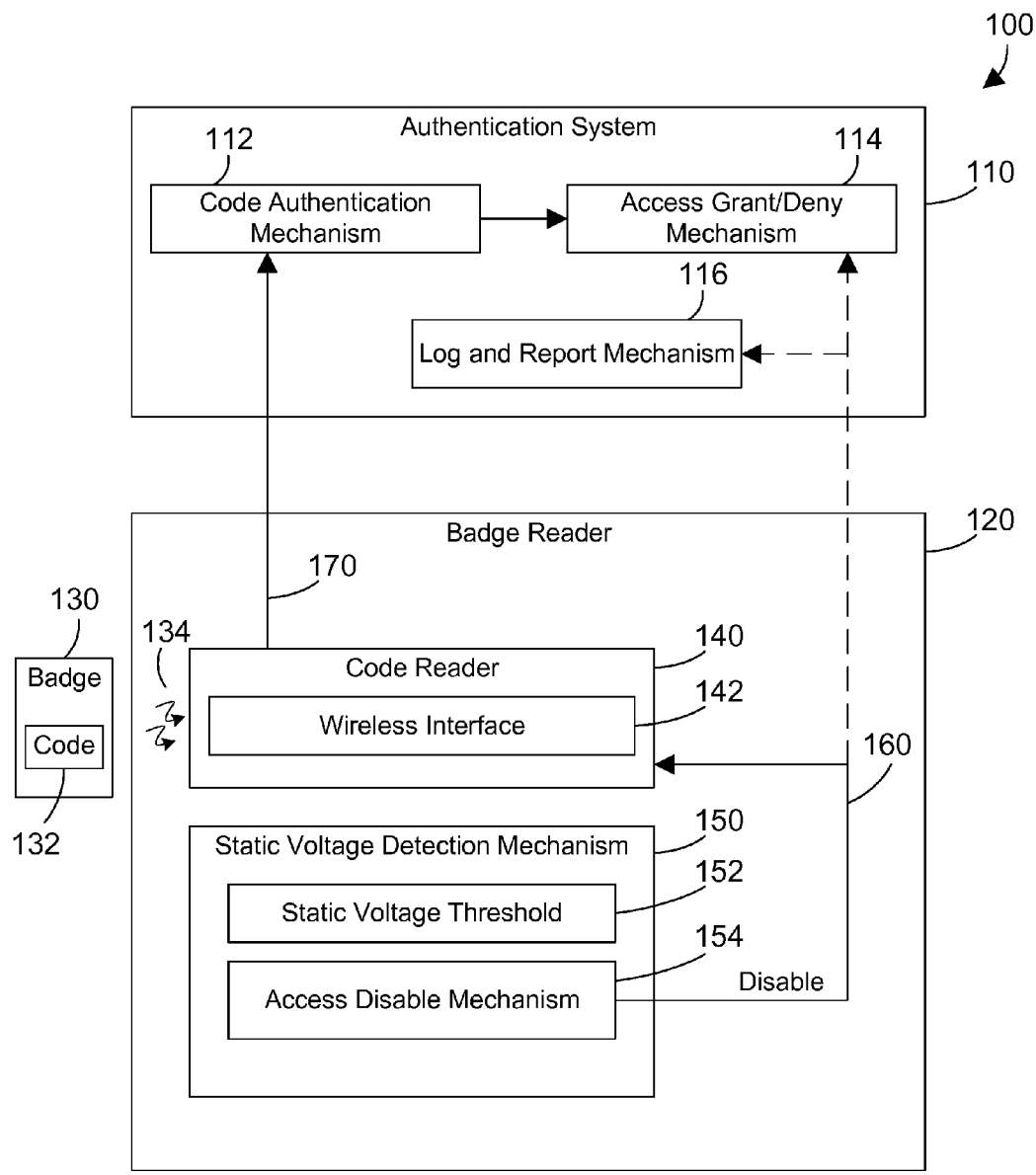
FIG. 1 is a block diagram of an access control system in accordance with the disclosure and claims herein.

Referring to FIG. 1, an access control system 100 includes an authentication system 110 and a badge reader 120. The badge reader 120 includes a code reader 140 that has a wireless interface 142 that reads code information 132 from a suitable badge 130. In one specific implementation, the code 132 is a numeric identifier stored on a radio frequency identification (RFID) chip on the badge 130. However, any suitable code and technology to wirelessly transferring to code to the code reader 140 could be used. When the wireless interface 142 scans the badge 130, the code 132 is transmitted wirelessly as shown at 134 from the badge 130 to the wireless interface 142. To authenticate the user using the badge 130, the code reader 140 sends the code 132 as shown at 170 to a code authentication mechanism 112 in the authentication system 110. In response, the authentication system 110 determines whether the user corresponding to the badge 130 has rights that allow the user the requested access. When the user does not have rights to the requested access, the access grant/deny mechanism 114 denies access to the user. When the user has rights to the requested access, the access grant/deny mechanism 114 allows access to the user. For example, if the badge reader 120 is placed at an entry door, when the authentication system determines the user is authorized, according to the code 132, the access/grant deny mechanism 114 could activate an electric lock to unlock the door. The functions described above in this paragraph are similar to those functions performed by prior art badge readers, badges and authentication systems in known access control systems.

Figure 4:
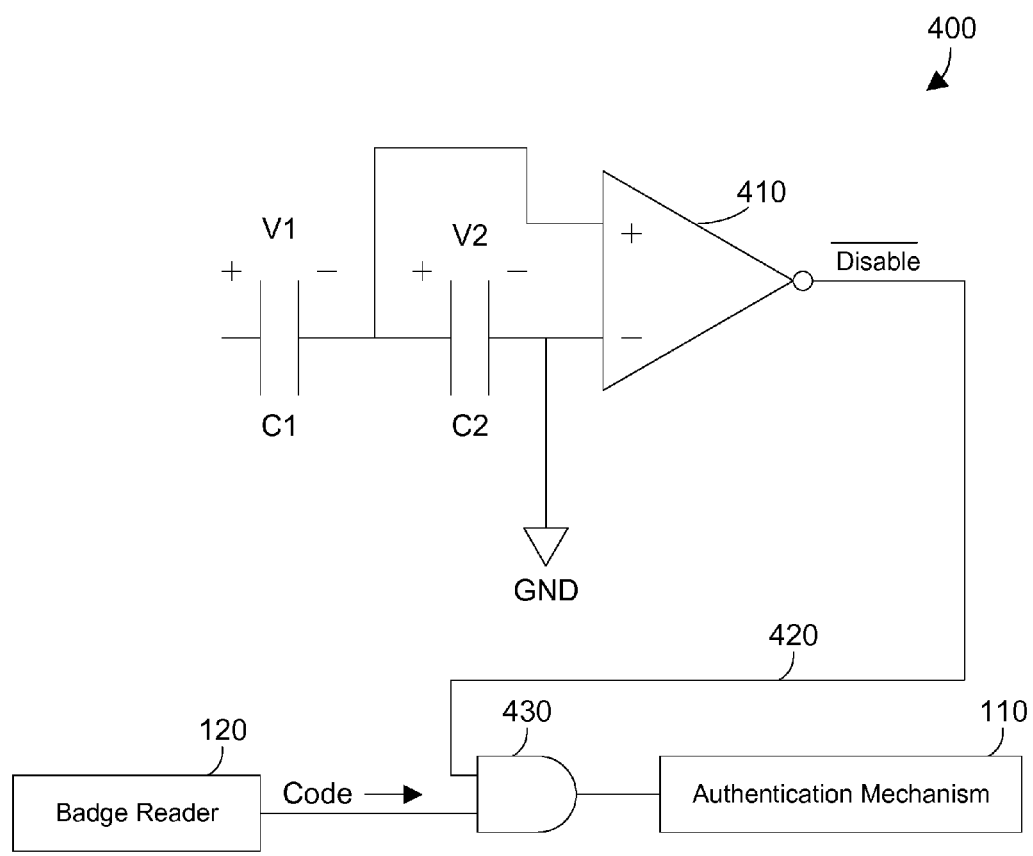
FIG. 4 is a schematic diagram showing one possible implementation for the static voltage detection mechanism 150 shown in FIGS. 1 and 3.
Figure 7:
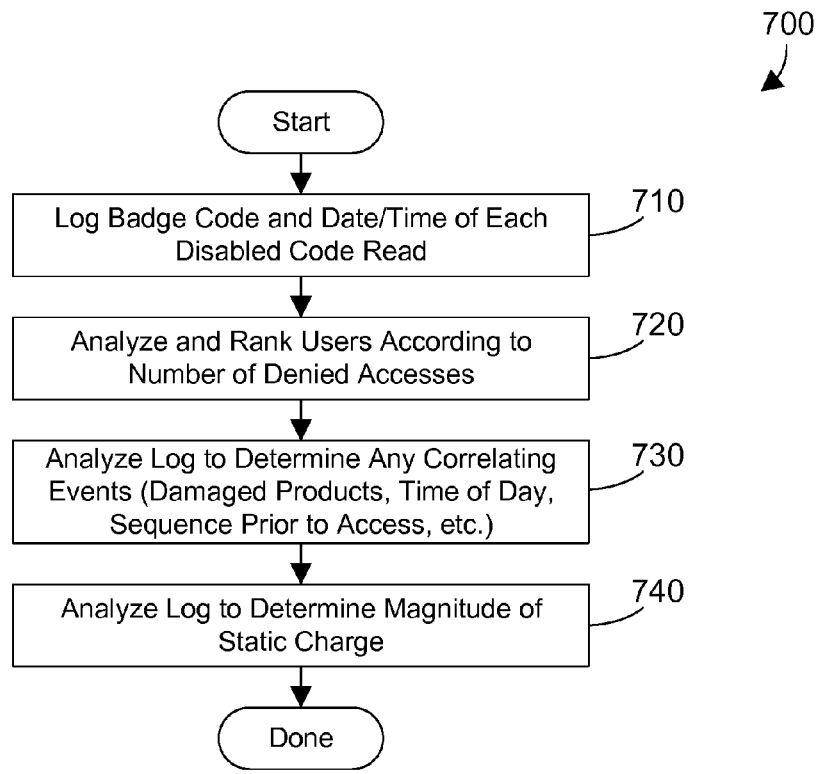
FIG. 7 is a flow diagram of a method for logging a badge code and date/time for each denied access, and for providing correlations and reports based on this logged information.
Figure 8:
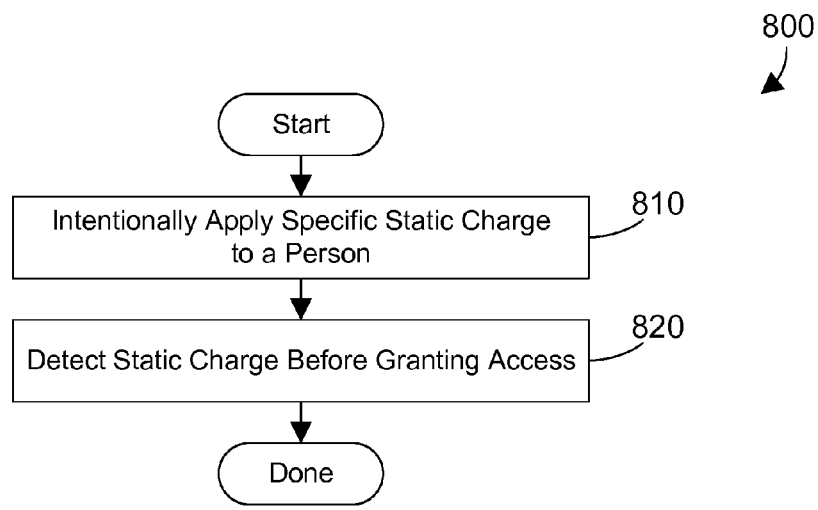
FIG. 8 is a flow diagram of an alternative embodiment that could use the same system to require a minimum level of static charge on the person before granting access.

The access control system 100 in FIG. 1, in addition to the prior art functions described above, additionally includes functions related to detecting static voltage and denying access to the user when excessive static voltage is present. A static voltage detection mechanism 150 detects static voltage on the badge 130. When the static voltage on the badge 130 is greater than a defined static voltage threshold 152, an access disable mechanism 154 provides a disable signal 160 that causes the authentication system 110 to deny access to the user. This can happen in different ways. In a first embodiment shown by the solid lines for signal 160, the disable signal 160 disables the code reader 140 from transmitting the code 132 to the code authentication mechanism 112 via signal 170. This means the code authentication mechanism 112 is not aware the user tried to authenticate because it never received the code 132 from the badge 130, so the user is denied access. In a second embodiment shown by the dotted lines for signal 160, the code reader still sends the code 132 from the badge 130 to the code authentication mechanism 112 via signal 170, but the access grant/deny mechanism 114 receives the disable signal 160, which informs the access grant/deny mechanism 114 to deny access to the user. The disable signal 160 could be as simple as single digital level line driving a digital gate (as shown in FIG. 4), or could be much more sophisticated, such as a wireless network message transmitted from the badge reader 120 to a remote authentication system 110. The disable signal 160 may optionally also be provided to a log and report mechanism 116, which logs the code 132 of the badge 130 with a corresponding date and time. By logging the denied accesses, the log can be used later to rank users according to the number of times they were denied, and to correlate the time of denied accesses to other events in the system.

Figure 2:
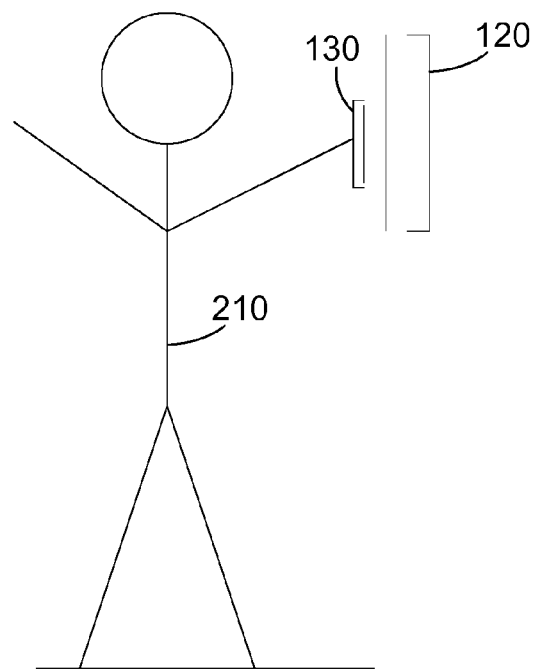
FIG. 2 is a diagram representing a user placing a badge in proximity to a non-contact badge reader to gain access to an area that is sensitive to ESD.
Figure 3:
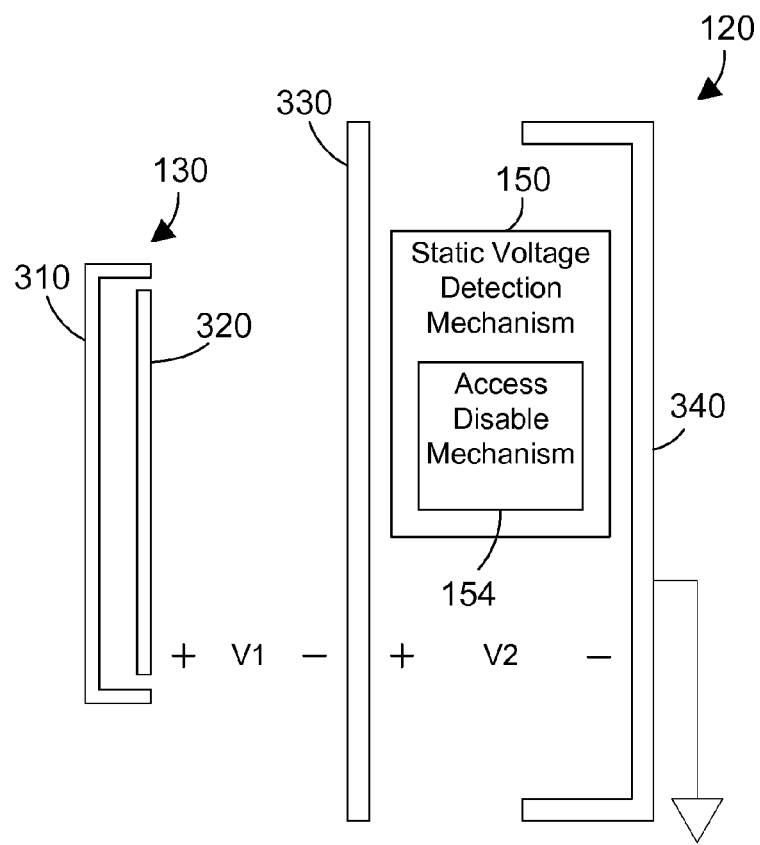
FIG. 3 is a block diagram showing suitable features of the badge and badge reader that allow sensing static voltage level of the user.

FIG. 2 shows a stick figure person 210 with a badge 130 raised to a badge reader 120 to gain access to something, such as to open a door to a lab that includes sensitive electronic circuitry or equipment. FIG. 3 shows suitable configurations for the badge 130 and badge reader 120 that allows detecting static voltage on the person 210. The badge 130 includes an electrically conductive outer case 310 that is electrically insulated from the face 320 of the badge, which contains the code to be read by the badge reader. The case 310 could be made of metal or any other electrically conductive material so that when a user takes the badge 130 in hand, any static charge on the person's hand will be conducted to the case 310. The badge reader 120 includes a front portion 330 that is electrically conductive but insulated from an electrically conductive back portion 340, which is grounded. The conductive back portion 310 of badge 130 and the conductive front portion 330 of the badge reader 120 create a first type of parallel plate capacitor that allows detecting a voltage V1 between the two. The conductive front portion 330 of the badge reader 120 and conductive back portion 340 of the badge reader 120 create a second type of parallel plate capacitor that allows detecting a voltage V2 between the two. Because the back plate 340 is grounded, the sum of the two voltages V1 and V2 is the static voltage of the user. The static voltage detection mechanism 150 detects the static voltage level (V1+V2), and when the static voltage level is greater than the defined static voltage threshold 152 in FIG. 1, the access disable mechanism 154 causes the authentication system to deny access to the user. Once the user discharges the static voltage on the badge to a level below the static voltage threshold 152, the badge reader 120 will allow access. The combination of the badge 130 and badge reader 132 thus provides a sure way to deny access to a person when the person has excessive static energy, such as an excessive static voltage.

One suitable implementation for the static voltage detection mechanism 150 in FIG. 1 is shown as a circuit 400 in FIG. 4. A comparator 410 such as an operational amplifier (op-amp) determines the difference between the sum of V1 and V2 on the minus input and the voltage V2 on the plus input. Voltage V2 thus defines the static voltage threshold 152 shown in FIG. 1. [Correct?] When the total voltage V1+V2, which represents the voltage on the badge 130, and therefore on the user, is greater than the voltage V2, the Disable output signal 420 is driven low. Note the disable output signal 420 drives one input of a two-input AND gate that has its other input coupled to the badge reader 120 in the path between the badge reader 120 and the authentication mechanism 110. This means when the disable signal is driven low, the code coming from the badge reader does not make it through the AND gate 430 to the authentication mechanism 110. When the disable signal is high, meaning authentication of the user is not disabled, the code from the badge reader 120 goes through the AND gate 430 to the authentication mechanism 110, thereby allowing the user to be granted or denied access according to whether the user has rights to the requested access.

The static voltage threshold V2 is preferably set to a very low level, less than ten volts. The design of the static voltage detection mechanism 400 can vary according to the needs of the user. Referring to FIG. 3, the thickness of the conductive housing components, area of the conductive housing components, conductive material they are made of, their spacing, and the desired spacing between the badge and the badge reader when reading the badge will all come into play to make the static voltage detection mechanism perform as desired.

Referring to FIG. 5, a method 500 in accordance with the disclosure and claims herein detects static energy (step 510). When the detected static energy is greater than a defined static energy threshold (step 520=YES), the code from the badge reader is not sent to the authentication system (step 540). When the detected static energy is not greater than the static energy threshold (step 520=NO), the code from the badge reader is sent to the authentication system (step 530). Method 500 is then done. While method 500 prevents the code from being sent from the badge reader to the authentication system, one skilled in the art will realize that instead of inhibiting or enabling the sending of the code from the badge reader to the authentication system, a signal can be made to inform the authentication system to deny the user access.

There are numerous different applications for an access control system that can sense static energy, as described herein. Referring to FIG. 6, a table is shown with a few sample applications for such a system. An entry to a lab or area with sensitive electronic components is shown at 610. Thus, a door could be electrically locked with a badge reader outside the door. For a user to gain access the restricted area, the user has to authenticate to the authentication system by presenting his or her badge. Authentication cannot happen until the user discharges all static energy from his or her body. Point of use electronic equipment is shown at 620. For example, an oscilloscope that is sensitive to ESD could tristate its probes until the user gains access to the scope using his or her badge without excess static energy. A badge reader could be placed at a service door to server hardware, as shown at 630. The user has to have excess static charge discharged before being admitted through the door. Because static electricity is well-known to cause fires at fuel stations, a company operating a fleet of vehicles could use the access control system disclosed herein to inhibit the fuel pump of a fueling station when excessive static energy is detected, as shown at 640. In addition, the static voltage detection mechanism could be built into different things, such as a lab door handle at 650, equipment buttons at 660, and a seat or chair at 670. Of course, these sample applications in FIG. 6 are not limiting. The disclosure and claims herein expressly extend to any and all applications where detecting static electricity is needed and a decision to allow or deny access can be made taking into account the detected level of static electricity.

As mentioned briefly above with respect to FIG. 1, the access control system 100 can optionally include a log and report mechanism 116, which logs the code 132 and the corresponding date and time when an access is denied (step 710). The log preferably includes all denied accesses by all users. By logging the denied accesses, the logged data may then be analyzed in any suitable method for any suitable ends. For example, the authorized users can be ranked according to the number of denied accesses (step 720). This could be a factor in evaluating employee performance, or could alert that inspection of ESD devices and procedures for some employees may be needed. In addition, the log can be analyzed to determine any correlating events (step 730), which can include any suitable event, including damaged products, time of day, sequence prior to access, etc. The log can also be analyzed to determine magnitude of the static charge (step 740). This would require a redesign of the static voltage detector mechanism to have multiple outputs each corresponding to a different static voltage level.

As discussed extensively herein, due to the destructibility of ESD on electronic components and equipment, the primary usage for the access control system described and claimed herein is to assure the static voltage level is below some specified static voltage threshold before granting access. However, the ability to detect a static charge on a user gives rise to another possible application. Let's assume the issue is security, and ESD is not an issue. A specific static charge could be intentionally applied to a person (step 810). The static charge on the person must then exceed some static voltage threshold before granting access (step 820). The application of the static charge in step 810 can thus become a preliminary step in being granted access. A simple example will illustrate. Let's assume a badge reader includes a finger hole with a metal contact that applies the specific static charge in step 810. Those authorized persons who know how to use the system will know they have to insert a finger into the finger hole for a few seconds to apply the static charge, followed by detecting a minimum level of static charge before granting access. This two-step authentication would not be known by someone who steals a badge in an attempt to access a secure area, so without knowing to apply the specific static charge in step 810 before attempting to authenticate in step 820, the person will not be allowed access to the secure area.

An access control system removes the human element from static protection by detecting a level of static energy when the user attempts to authenticate to the access control system, and when the user's detected level of static energy exceeds a defined threshold, access is denied until the user discharges the static energy. A static energy detection mechanism in a badge reader includes two conductive plates that form a first capacitor, and the space between an electrically conductive badge and one of the conductive plates on the badge reader forms a second capacitor. Using these two capacitors, the level of static energy on the user can be measured by the sum of the voltage across these two capacitors as the user presents the badge to the badge reader. The access control system assures the user is properly grounded before allowing access to an area, equipment, etc.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A badge reader comprising:
   a code reader having a wireless interface for reading wirelessly code information stored on an electrically conductive badge held by a user in proximity to the badge reader;
   a static voltage detection mechanism that detects a static voltage level on the badge; and
   an access disable mechanism coupled to the static voltage detection mechanism that compares the detected static voltage level on the badge to a defined static voltage threshold, and when the detected static voltage level on the badge exceeds the defined static voltage threshold, causes an authentication system that grants or denies access to the user when the code information from the badge is received to deny access to the user.

2. The badge reader of claim 1 wherein, when the static voltage level on the badge does not exceed the defined static voltage threshold, the access disable mechanism causes the authentication system to grant or deny access to the user according to the code information from the badge.

3. The badge reader of claim 1 wherein the access disable mechanism causes the authentication system to deny access to the user by inhibiting transmission of the code information from the badge to the authentication system.

4. The badge reader for claim 1 wherein the access disable mechanism causes the authentication system to deny access to the user by:
   transmitting the code information from the badge to the authentication system; and
   sending an indication to disable access for the user corresponding to the code information.

5. The badge reader of claim 1 wherein the static voltage detection mechanism detects the static voltage level on the badge by summing a first voltage on a first capacitance between the badge and the badge reader with a second voltage on a second capacitance between two portions of the badge reader.

6. The badge reader of claim 1 wherein the access comprises access of the user to an area or equipment.

7. The badge reader of claim 1 wherein the code information comprises a numerical identifier stored on a radio frequency identification (RFID) chip.

8. The badge reader of claim 1 further comprising:
   a log and report mechanism that, when access is denied to the user, logs the code information stored on the badge with a corresponding date and time when the access was denied, and analyzes the logged information to analyze and rank a plurality of users according to a number of denied accesses.

9. The badge reader of claim 8 wherein the log and report mechanism analyzes the logged information to determine at least one event correlating to the denied access.

* * * * *